US012175580B2

(12) United States Patent
Bradley et al.

(10) Patent No.: US 12,175,580 B2
(45) Date of Patent: Dec. 24, 2024

(54) VIRTUAL REALITY AVATAR ATTENTION-BASED SERVICES

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 45 days.

(21) Appl. No.: 17/821,722

(22) Filed: Aug. 23, 2022

(65) Prior Publication Data

US 2024/0070948 A1    Feb. 29, 2024

(51) Int. Cl.
  *G06T 13/40*    (2011.01)
  *G06F 3/04815*   (2022.01)
  *G06T 19/00*    (2011.01)

(52) U.S. Cl.
  CPC .......... *G06T 13/40* (2013.01); *G06F 3/04815* (2013.01); *G06T 19/003* (2013.01)

(58) Field of Classification Search
  CPC .... G06T 13/40; G06T 19/003; G06F 3/04815
  See application file for complete search history.

(56) References Cited

U.S. PATENT DOCUMENTS

2006/0259473 A1 * 11/2006 Li ................ G06Q 30/02
2007/0013691 A1 *  1/2007 Jung ............. G06Q 20/10
                                        345/419

(Continued)

FOREIGN PATENT DOCUMENTS

WO    WO-2018057921 A1 *  3/2018

OTHER PUBLICATIONS

Jain, D., Findlater, L., Gilkeson, J., Holland, B., Duraiswami, R., Zotkin, D., . . . & Froehlich, J. E. (Apr. 2015). Head-mounted display visualizations to support sound awareness for the deaf and hard of hearing. In Proceedings of the 33rd Annual ACM Conference on Human Factors in Computing Systems (pp. 241-250).*

*Primary Examiner* — Sarah Lhymn
(74) *Attorney, Agent, or Firm* — Guntin & Gust, PLC; Mark Wilinski

(57) ABSTRACT

The disclosed technology relates to detection of attention exhibited by a second user to a first user's avatar in a virtual reality environment. A first user's avatar activity and the second user's activity are evaluated to determine the second user's (e.g., via another avatar) attention level directed towards first user's avatar. Information can be sent to notify the first user that the second user's attention level has satisfied attention-level criterion data. For example, if the second user is viewing and/or is within audio range of the first user for too long of a time or too frequently, then the first user can be notified and/or other action taken. Remedial action is available for negative attention, such blocking the second user from experiencing the first user in the environment. Detection of attention for positive purposes is available, such as to reward an influencer whose avatar is receiving significant attention from followers.

20 Claims, 15 Drawing Sheets

(56) References Cited

U.S. PATENT DOCUMENTS

| | | | |
|---|---|---|---|
| 2009/0113040 A1* | 4/2009 | Zalewski | G06Q 10/00 |
| | | | 709/224 |
| 2011/0131509 A1* | 6/2011 | Brillhart | G06Q 30/02 |
| | | | 715/757 |
| 2013/0047217 A1* | 2/2013 | Shuster | G06F 40/143 |
| | | | 726/4 |
| 2014/0249891 A1* | 9/2014 | Olguin Olguin | G06Q 10/0639 |
| | | | 705/7.38 |
| 2015/0067511 A1* | 3/2015 | Lee | G06F 3/165 |
| | | | 715/716 |
| 2016/0007083 A1* | 1/2016 | Gurha | H04N 21/25808 |
| | | | 725/13 |
| 2018/0292887 A1* | 10/2018 | Bastide | G06Q 10/10 |
| 2018/0342106 A1* | 11/2018 | Rosado | G06Q 10/109 |
| 2018/0350144 A1* | 12/2018 | Rathod | G06Q 20/3224 |
| 2019/0188895 A1* | 6/2019 | Miller, IV | G06F 3/0304 |
| 2020/0099640 A1* | 3/2020 | Andre | H04L 67/535 |
| 2020/0134298 A1* | 4/2020 | Zavesky | A63F 13/33 |
| 2020/0368616 A1* | 11/2020 | Delamont | H04N 13/239 |
| 2021/0089117 A1* | 3/2021 | Bodolec | G09G 5/37 |
| 2021/0097875 A1* | 4/2021 | Alexander, IV | G06F 3/0346 |
| 2021/0104100 A1* | 4/2021 | Whitney | G06T 19/006 |
| 2023/0316674 A1* | 10/2023 | Boesel | G06T 13/40 |
| | | | 345/633 |
| 2023/0385010 A1* | 11/2023 | Fitzgerald | H04N 21/42204 |

\* cited by examiner

VIRTUAL REALITY AVATAR ATTENTION-BASED SERVICES

TECHNICAL FIELD

The subject application relates to the maintaining and use of information in general, and more particularly to maintaining and using information related to virtual reality applications, and related embodiments.

BACKGROUND

Contemporary users of virtual reality applications change among different virtual environments from time to time, e.g., from a meeting application to a game application. Even if a user has only one virtual environment available, the user sometimes has to leave that virtual environment. Such scenarios cause issues when attempting to go back into the virtual environment.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
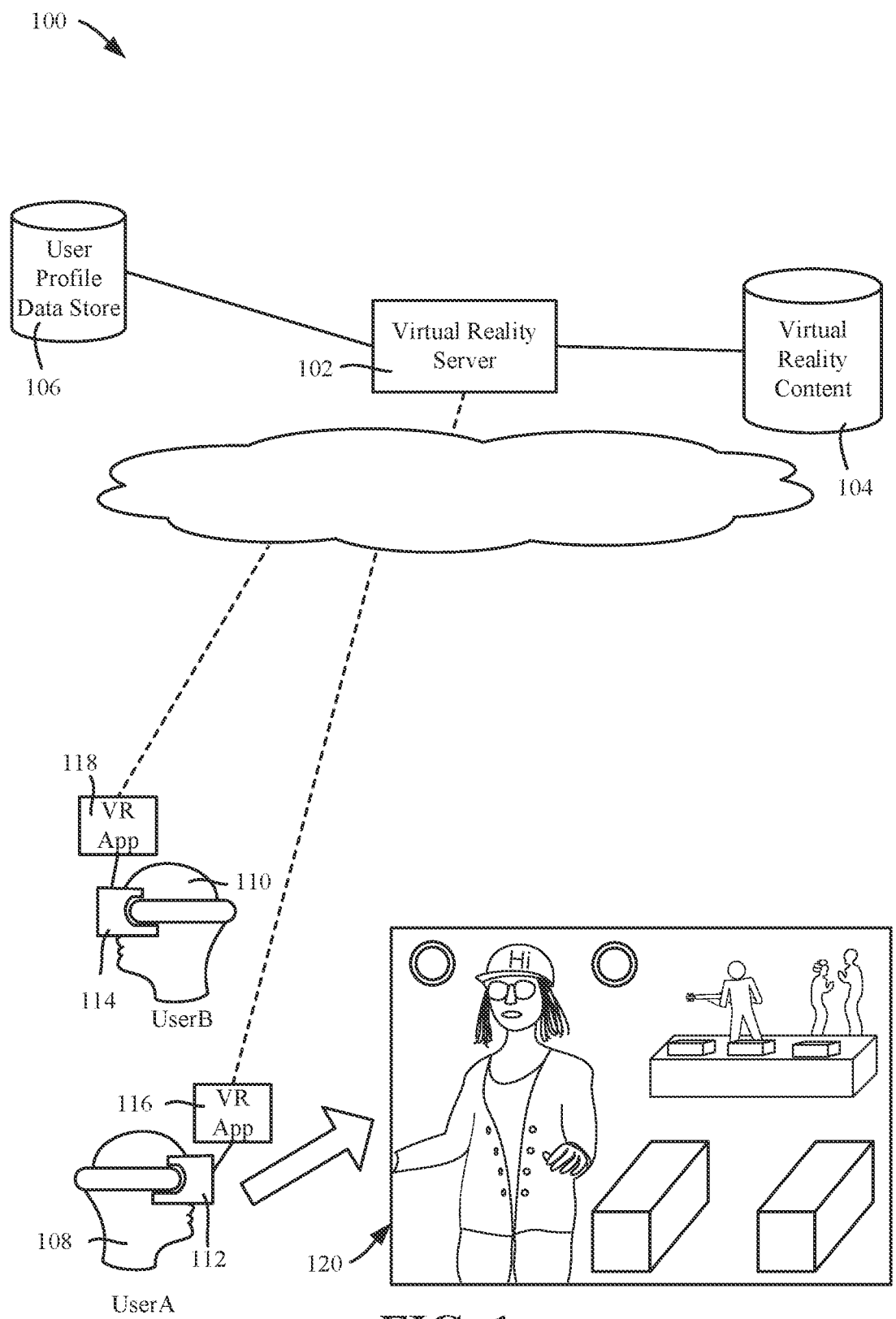
FIG. 1 is a block diagram of an example system/architecture directed towards providing virtual reality attention-based services, in accordance with various aspects and embodiments of the subject disclosure.

The technology described herein is generally directed towards detection of one user, via his or her avatar in a virtual reality environment, being paid attention to by another user. Action can be taken with respect to the detection, e.g., when the other user's activity by which the attention level is detected exceeds specified criterion data. The attention may be unwanted (e.g., exhibited by a potential "stalker") or wanted (e.g., exhibited by a follower of a paid influencer). Service features and/or actions may be provided based on whether the attention is wanted or unwanted. Actions include, but are not limited to, alerting a user, blocking the activity of the other user, and the like for negative attention, or potentially rewarding the user or the other based on positive attention.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system/architecture 100 including a virtual reality (VR) server 102, which is coupled to a virtual reality content data store 104 to present a virtual environment 104 to participating users. As described herein, one or more users can have their user profile data maintained in a user profile data store (e.g., database) 106.

In general, the content data store 104 specifies data to create a virtual reality environment that users can experience together. Such virtual reality content may create any of a number of different types of experiences for the users. For example, virtual reality content may create a meeting, a party, a concert, or many other types of environments where people may gather together virtually. To this end, the virtual reality server 102 server has access to virtual reality content in the data store 104, which may be presented to create the virtual reality environment that users can experience together.

Any number of users can participate in a virtual reality session; two example users 108 (UserA) and 110 (UserB) are depicted in the example of FIG. 1. The users 108 and 110 are with equipped with virtual reality devices 112 and 114, (e.g., a virtual reality viewer and audio capabilities, such as ear phones and microphone), respectively. Respective application programs (VR Apps) 116 and 118 can be incorporated into and/or coupled to (e.g., via another device such as a smartphone) the respective virtual reality devices 112 and 114. Note that the example virtual reality session 120 that is represented in FIG. 1 is being experienced from the perspective of the UserA 108.

Figure 7:
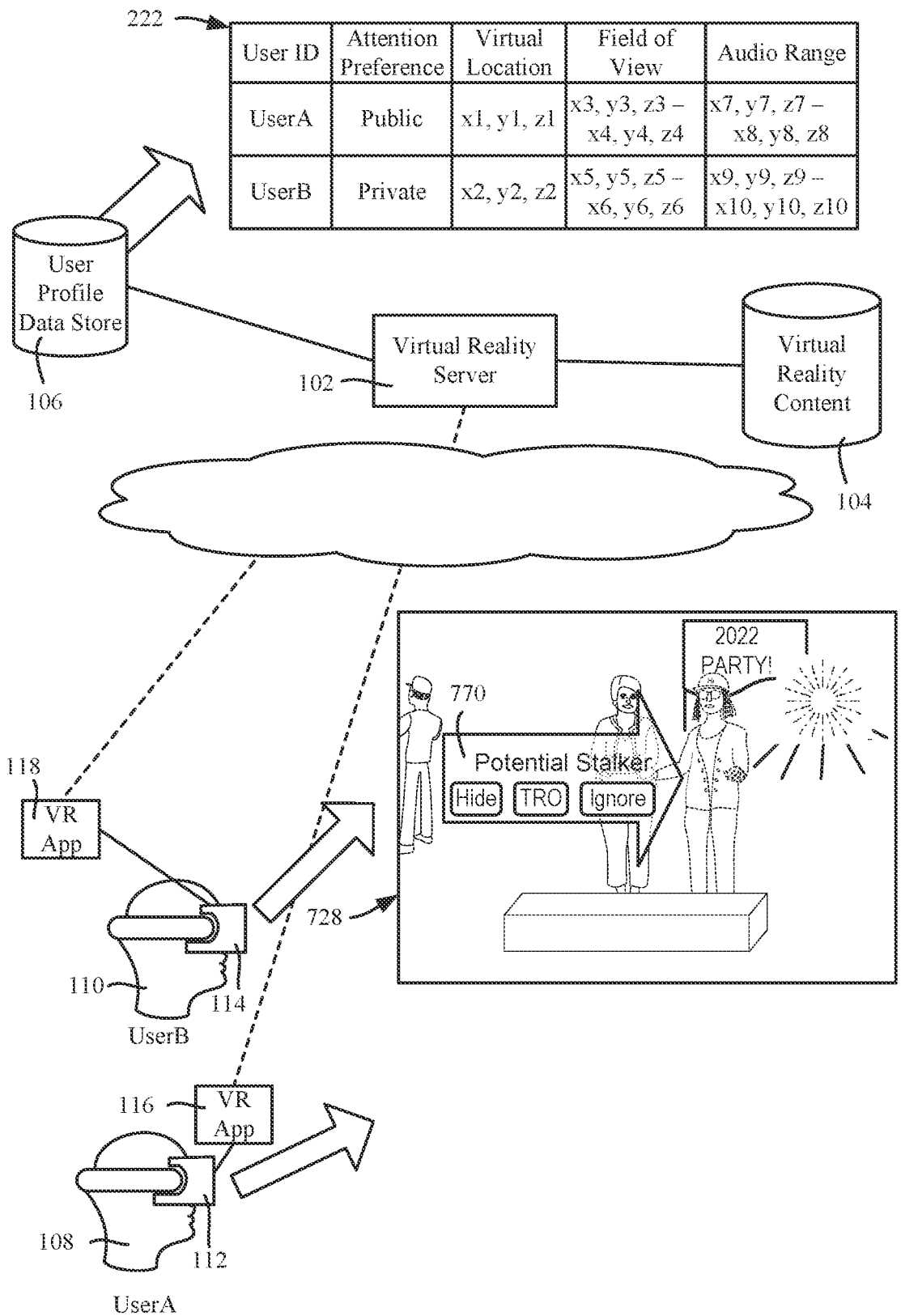
FIG. 7 is a block diagram of an example system/architecture, including a representation of an example virtual reality environment including an attention notification and interactive user interface for taking action based on detection of negative attention, in accordance with various aspects and embodiments of the subject disclosure.

The user profile data store 106 maintains various data related to each user's participation in the virtual reality environment, as shown via the data structure (e.g., database records). Each user may use a setting within the user profile to indicate his or her attention preference. In the examples used herein, the preferences are public or private, although it is feasible to have more granular preference data. For example, attention preference data may include some or all (or even other) setting such as public, mostly public (e.g., specifically-identified users blocked), semi-private (e.g., specifically-identified users unblocked), private (block or not based on user input), anonymous (e.g., a generic, unidentifiable avatar) and so on. Block, for example, can mean be not being visible or audible to another user. It is also feasible that a "private" setting can link to another information data store, such as what private means to different users, e.g., block UserX, permanently block (unless explicitly changed back) UserY, show a generic avatar to UserZ, and so on. Indeed, one example described herein with respect to FIG. 7 refers to a temporary restraining order, or TRO, in which one user (at least) temporarily blocks another user; the identity of the blocking user is associated with the identity of the blocked user in the system, with the TRO status connected thereto.

The users may use interactive virtual reality display settings, settings via another interface (e.g., of a smartphone application), gestures, spoken commands and so forth to set the preference data. For example, as shown via the verbal command 224 and/or the interface 226 in the example virtual reality environment view 228 of the UserB 110 in FIG. 2, the UserB 110 may turn on a "Block Attention Followers" setting or the like that creates a private attention preference setting 230 in their user profile data; (private or public may be the default). This type of private setting may be used by users to track and deter any other potential users that may be stalking them or otherwise following them in an undesirable manner in the virtual reality environment.

During the virtual reality experience, the virtual reality server 102 tracks and records virtual location data for each user. This virtual location data may be virtual coordinates within the virtual reality environment and may be tracked and logged over time. Any changes in a user's virtual location may be recorded and timestamped such that each user's virtual location history during his or her experience is recorded. Furthermore, each user's virtual reality field of view within the virtual environment may be detected based on his or her location in the virtual environment, including via movement progression through the environment using virtual reality controllers, and the dynamically changing angle of the user's head position relative to the virtual reality environment, as detected by the position of their virtual reality viewer (e.g., 112). The virtual reality server 102 can therefore create a range of virtual coordinates that represent the field of view of images within the virtual reality environment of each user at any point in time. The field of view of each user may also be timestamped and logged over time.

Additionally, the virtual reality server 102 may detect an audio range for each user within the environment. This audio range represents a range of coordinates that define a virtual area within which a user's spoken utterances may be detected and presented to other users. Note that unlike real world scenarios, in a virtual reality environment, the virtual reality server 102 can control the audio range based on location, regardless of a user's actual speech volume levels.

Figure 3:
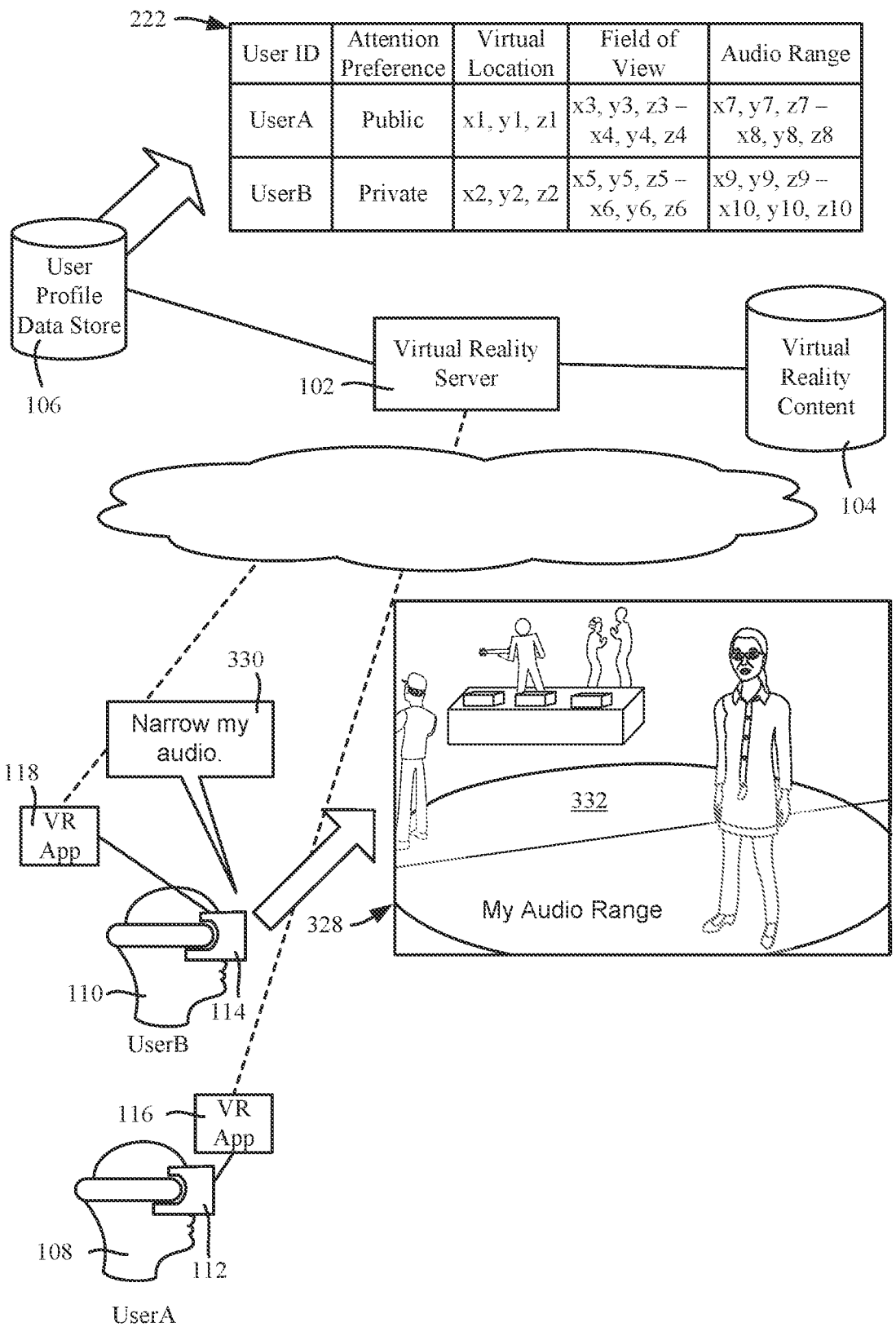
FIG. 3 is a block diagram of an example system/architecture, including a representation of an example virtual reality environment showing an adjustable audio range of a user represented by an avatar, in accordance with various aspects and embodiments of the subject disclosure.

An audio range can be specified by the user or by the virtual reality application, e.g., the application 118. For example, a virtual reality application may, by default, specify that any user can be heard within any virtual room in which his avatar is present by any other user who's avatar is also in that virtual room. However, a user may override that setting by specifying a smaller audio range that dictates how far out their own spoken utterances can be detected by other users within the environment, such as represented in FIG. 3 via the spoken command (block 330) of the UserB 110. Optionally, as represented in the updated virtual reality view 328 of FIG. 3 by the two-dimensional area 332 (e.g., defined by a location coordinate point and a radius or major and minor axes, which may alternatively be a three-dimensional volume), the user's audio range may be displayed visually to the user, e.g., the UserB 110, such that if the user speaks, the user knows how far the spoken utterances may be heard by others within the virtual environment. The virtual reality server 102, when presenting the virtual reality environment to other users, takes into account each user's audio range settings and only presents audio in areas as permitted by those settings. In another embodiment, the virtual reality server 102 may be configured by UserB 110 to limit the audio range of utterances matching certain contexts, keywords, or statements within the environment. In one example, a limited audio range may be applied for utterances that begin with a direct address ("Zoe, keep an eye on your pets") or a context that involves only family members. In a similar example, an expanded audio range may be triggered by keywords ("Let's Go Wildcats!") or broader audience contexts (like cheering for a team in a virtual stadium). Each of these states or the like may be configured explicitly by a user from the user profile 106 and/or may be bootstrapped by a default value from the virtual reality server 102. With no loss of generality, the contexts or demographics of other users (from the profile data store 106) may also be utilized. For example, if UserA 108 is a child in a virtual game, then an adult UserB of unknown origins may be excluded by the audio range criterion.

Figure 2:
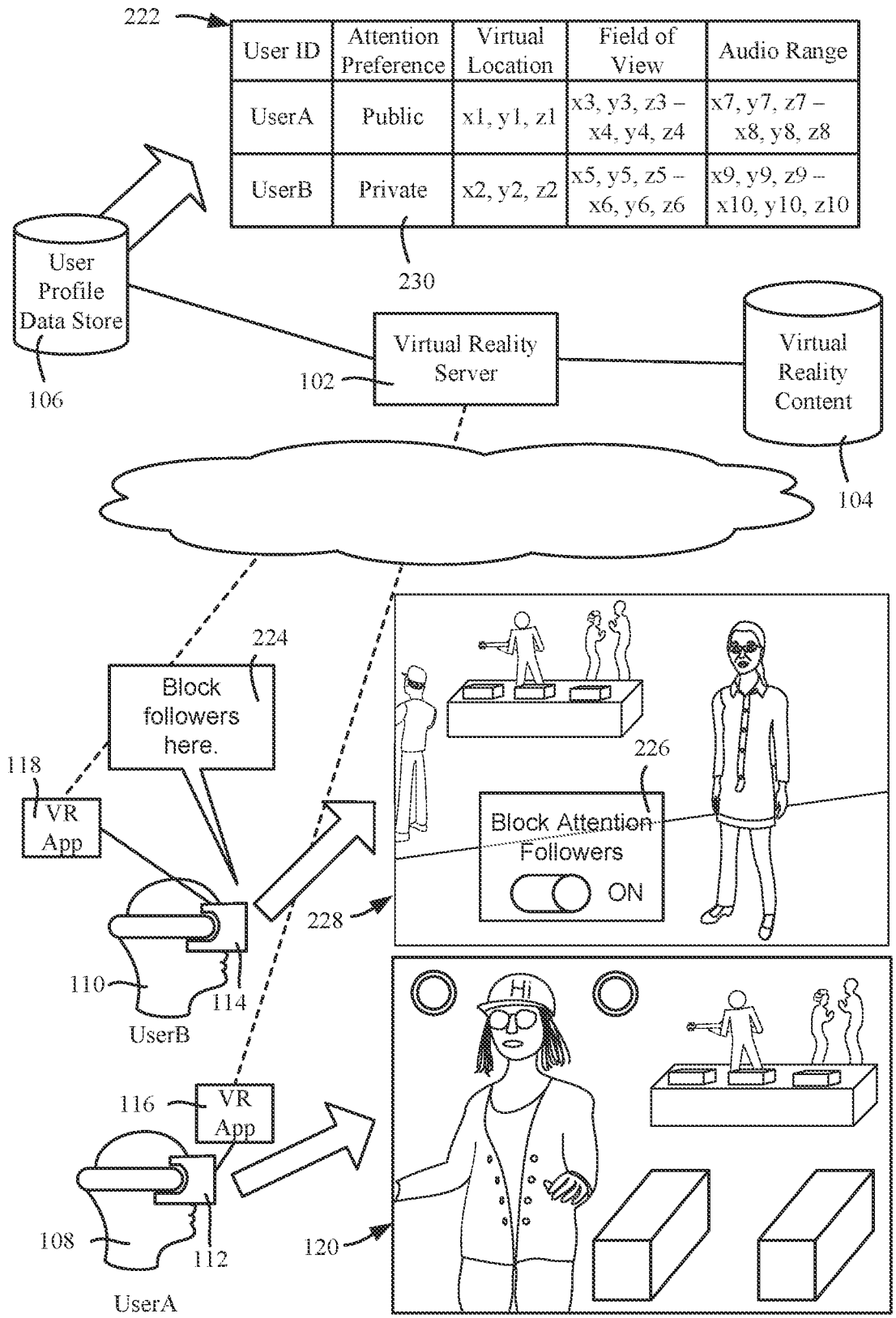
FIG. 2 is a block diagram of an example system/architecture, including a data structure and interactive interface for controlling attention of follower(s), in accordance with various aspects and embodiments of the subject disclosure.
Figure 4:
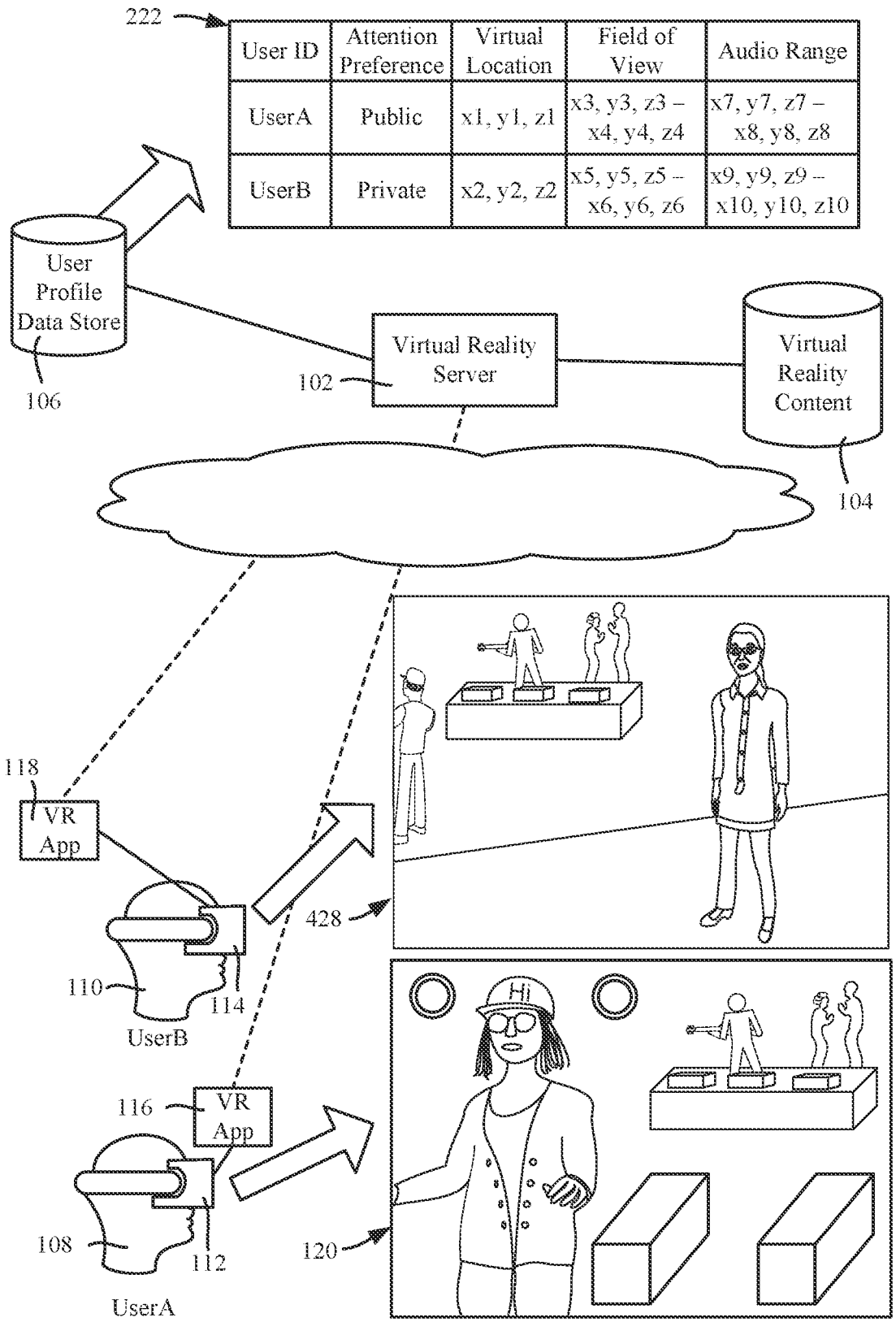
FIG. 4 is a block diagram of an example system/architecture, including different user views of an example virtual reality environment, in accordance with various aspects and embodiments of the subject disclosure.

As set forth herein and as generally represented in FIG. 4, if a user wants to detect, deter, and block negative attention while in a virtual reality environment, the user may have the attention preference setting at private, such as the UserB 110 in the examples shown in FIGS. 2-4. Because the UserA's location data and field of view may be tracked and logged over time, a pattern of unwanted attention towards the UserB 110 by the UserA 108 may be detected by analyzing the UserA's field of view log. This may be accomplished by comparing the UserA's field of view over time with the UserB 110 location data over the same period of time and detecting common timestamps, such that it is determined that the UserA 108 pays attention to the UserB 110 for long periods of time, or pays attention over a large number of times to (e.g., is frequently glancing at then looking away from) the avatar of the UserB 110. Note that the avatar of the UserA 108 may be invisible to the UserB 110; however the virtual server 102 detects the level of attention exhibited by the UserA 108 to the UserB 110.

Figure 5:
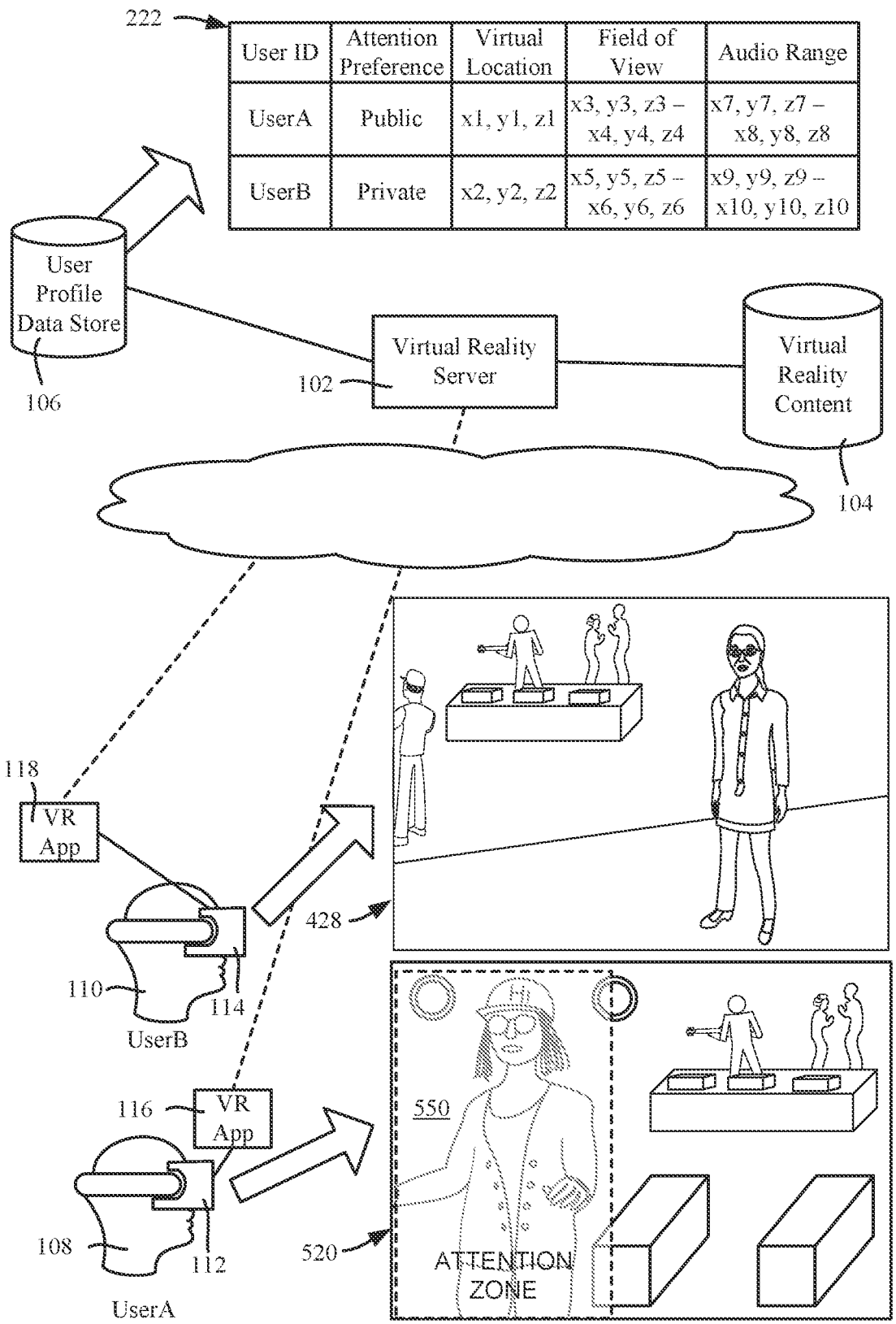
FIG. 5 is a block diagram of an example system/architecture, including different user views of an example virtual reality environment with one view augmented to highlight a user's attention zone, in accordance with various aspects and embodiments of the subject disclosure.

Alternatively, a subset of a user's actual field of view may be used. In this approach, the attention being paid may be fine-tuned such as to specify that only a zone that is a narrower subset of a user's field of view is used to detect attention. This attention zone may be central to the user's actual field of view rather than at the periphery, for example, as generally represented in FIG. 5 as the dashed, semi-transparent block 550 within the view 520 of the UserA 108. Note that for UserA the dashed, semi-transparent block 550 is not presented in the view 520 of the UserA 108 as shown in FIG. 5, but rather is shown as a representation for explanatory purposes only. Note, however, that the UserB 110 may be presented with such a view of her own avatar, such as by interacting to see a "mirror view" or the like of what another avatar is viewing, or at least likely viewing.

Figure 6:
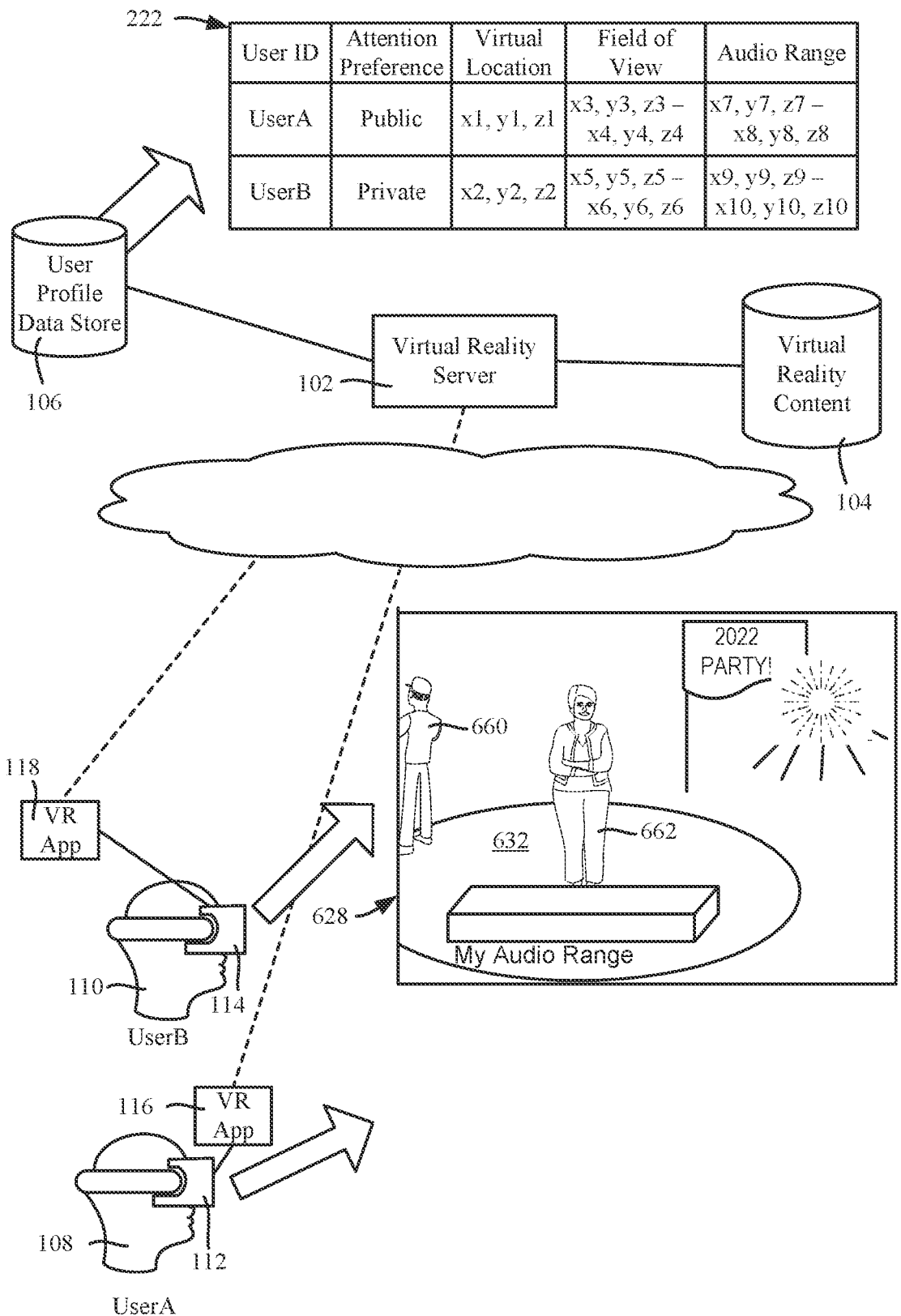
FIG. 6 is a block diagram of an example system/architecture, including a representation of an example virtual reality environment showing a user's audio range in which another user is potentially eavesdropping, in accordance with various aspects and embodiments of the subject disclosure.

As represented in FIG. 6, attention also may be detected if a user is frequently (or is remaining) within an audio range of another user, which can be indicative of intentional eavesdropping, for example. By using a logging approach such as described with respect to field of view logging over time, another user may be detected to be within the UserB's audio range (e.g., as represented by the area 632, although not necessarily actually visible to the UserB 110) for long periods of time and/or for frequent periods of time. It is noteworthy that the field of view of the other user need not include any view of the UserB 110 for the UserB 110 to be within the other user's audio range; (in FIG. 6, a user's avatar 660 is looking away from the UserB's avatar, not shown in UserB's view 628, but is within the audio range 632; the user represented by the avatar 662 is known to be in a conversation with the UserB 110, and is thus not audibly stalking the UserB 110). Therefore, this solution permits the detection of negative attention of another user (e.g., represented by the avatar 660) who may be frequently nearby but not necessarily viewing (or even being seen by) the UserB 110, but is detected as possibly audio stalking or paying other unwanted audio attention such as eavesdropping to the UserB 110.

It should be noted that the threshold criterion data can be varied based on a number of factors. For example, in a large get together, being in someone's field of view may not be stalking, such as being on a dance floor that many users are viewing. Thus, the number of other users viewing a user's avatar, as well as the distances from which they are viewing, can be factors that raises the attention threshold criterion, (e.g., only close viewing of one of many such viewers) can trigger the negative attention detection. Also, how many other users are within the field of view or a defined proximate distance of a user's avatar from the perspective of a viewing user can be considered; if many avatars are dancing on a smaller stage at the same time, then the viewing user is less likely to be looking at any one of them, particularly if viewing from a distance. Further, other factors such as number of avatars, fixed versus moving and so forth can be evaluated. Consider, for example, a large event such as a virtual concert; someone virtually attending from behind a user's avatar (e.g., seated in the rows behind) is likely to have the user's avatar in his field of view frequently and for long periods of time, but is watching the stage rather than stalking. Thus, the virtual crowd size as well as the fixed location data can be factors in raising the triggering threshold of the attention criterion data. Other factors are also feasible to use.

Upon the detection of negative attention, the virtual reality server 108 may take a number of actions to alert a user and block further attention; blocking can be automatic as configured by a user, possibly, but not necessarily, in conjunction with an alert. In one embodiment, the virtual reality server 102 may make an explicit notification to a user of the negative attention and offer remediation. This notification may be performed in a number of ways such as sending a message to the user and/or highlighting the source of the negative attention. In this case, as represented via the alert and interactive user interface 770 in the updated virtual view 728 of the UserB 110, the user may be presented with remediation options, whereby the user is in control of the action to take. Example, non-limiting options shown in FIG. 7 include "HIDE," in which case the virtual reality server 102 blocks the presentation of the UserB 110 to the UserA 108 in the UserA's virtual reality experience, (and optionally vice versa), "TRO," a (virtual) temporary restraining order, in which case the virtual reality server 102 creates an entry in the user profiles data store 106 (or other data store) to block this appearance and any future appearances of the UserB 110 to the UserA 108 in the UserA's virtual reality experience, (and optionally vice versa), or "IGNORE," in which case the virtual reality server 102 takes no action, although the virtual reality server 102 may continue to track the attention. Ignore can occur if the user takes no action within some time limit; in this way, for example, a user in a conversation with other users need not explicitly interact to take an "IGNORE" action for each and every other user in the conversation. Other actions are feasible, e.g., send a warning to the UserA 108 to cease his or her attention activity or else blocking will occur shortly, block audio only so that the UserB can see if the UserA attempts to get closer to hear better and is thus almost certainly audio stalking, and so on. In another embodiment, the application of an "IGNORE", "TRO", or "HIDE" action by one or more users (for example, UserB 110 applying one of these actions against UserA 108) may apply a visual, audible, or other indicator (a warning badge, a sound, an automated restriction and/or the like) onto the representation of UserA 108 or within the user profile 106.

Turning to positive attention tracking, in some situations attention may be sought out by a user rather than seeking to avoid it. This may occur, for example, when a user seeks out followers that give them attention that returns value in some way. In another situation, a user may hope that a particular other user notices them, such as a shy user who is hesitant to start a conversation but might do so if the other user seems to be paying significant attention to his or her avatar. Notification of attention can thus be for positive purposes.

Figure 8:
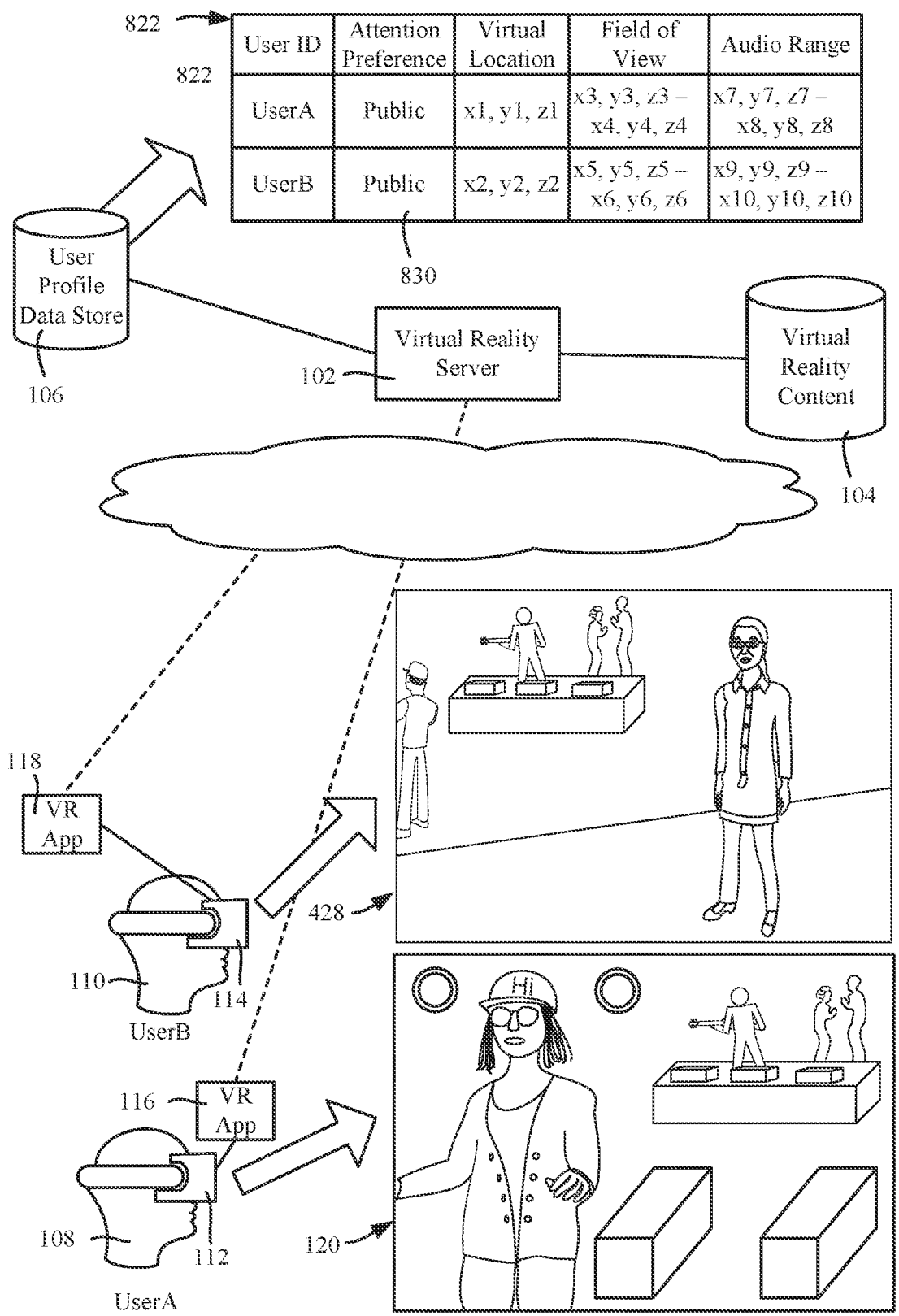
FIG. 8 is a block diagram of an example system/architecture, including a data structure by which a user can select a "public" attention option, in accordance with various aspects and embodiments of the subject disclosure.
Figure 9:
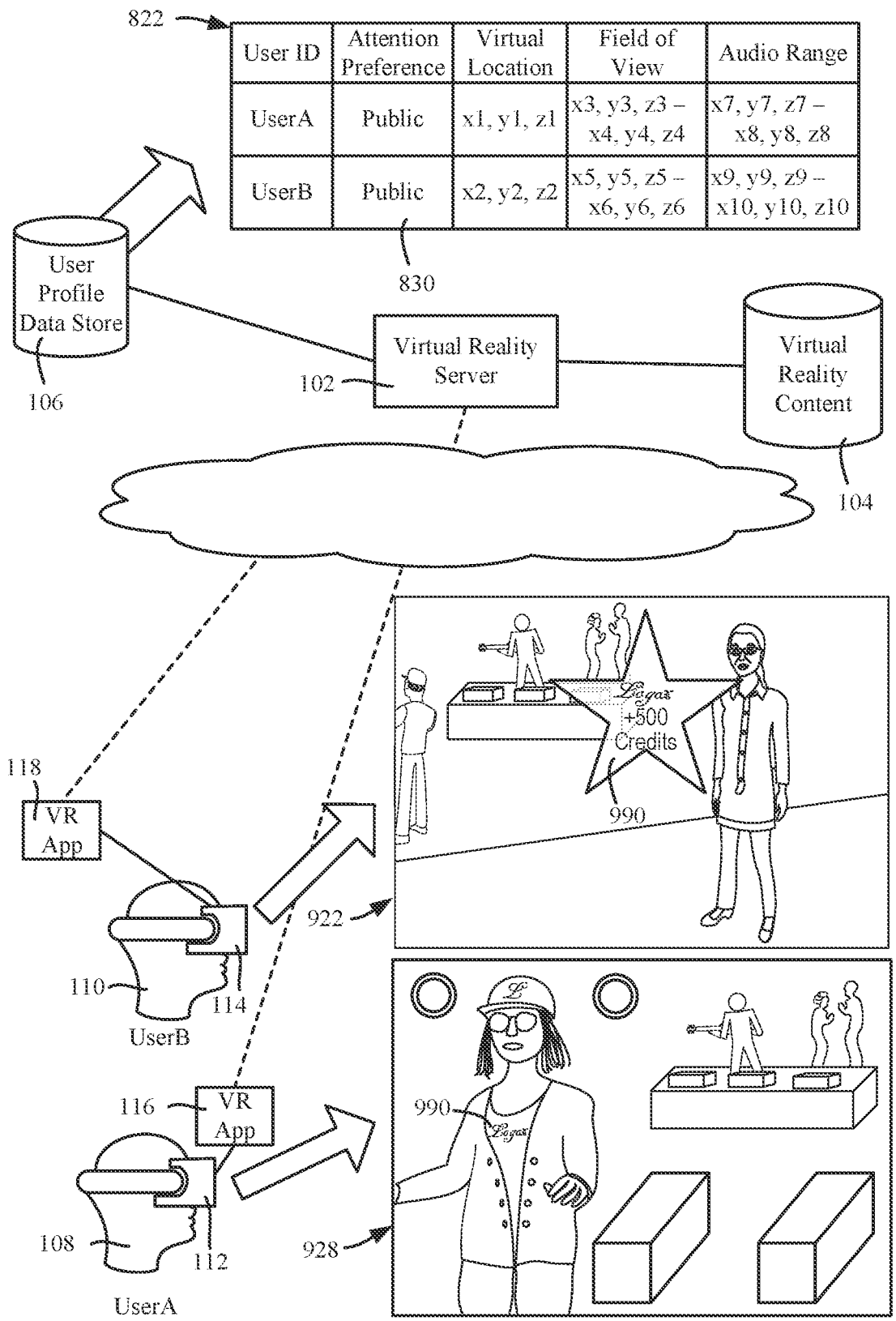
FIG. 9 is a block diagram of an example system/architecture, including an example interface showing a user being rewarded for attention to the user's avatar with respect to advertising, in accordance with various aspects and embodiments of the subject disclosure.
Figure 10:
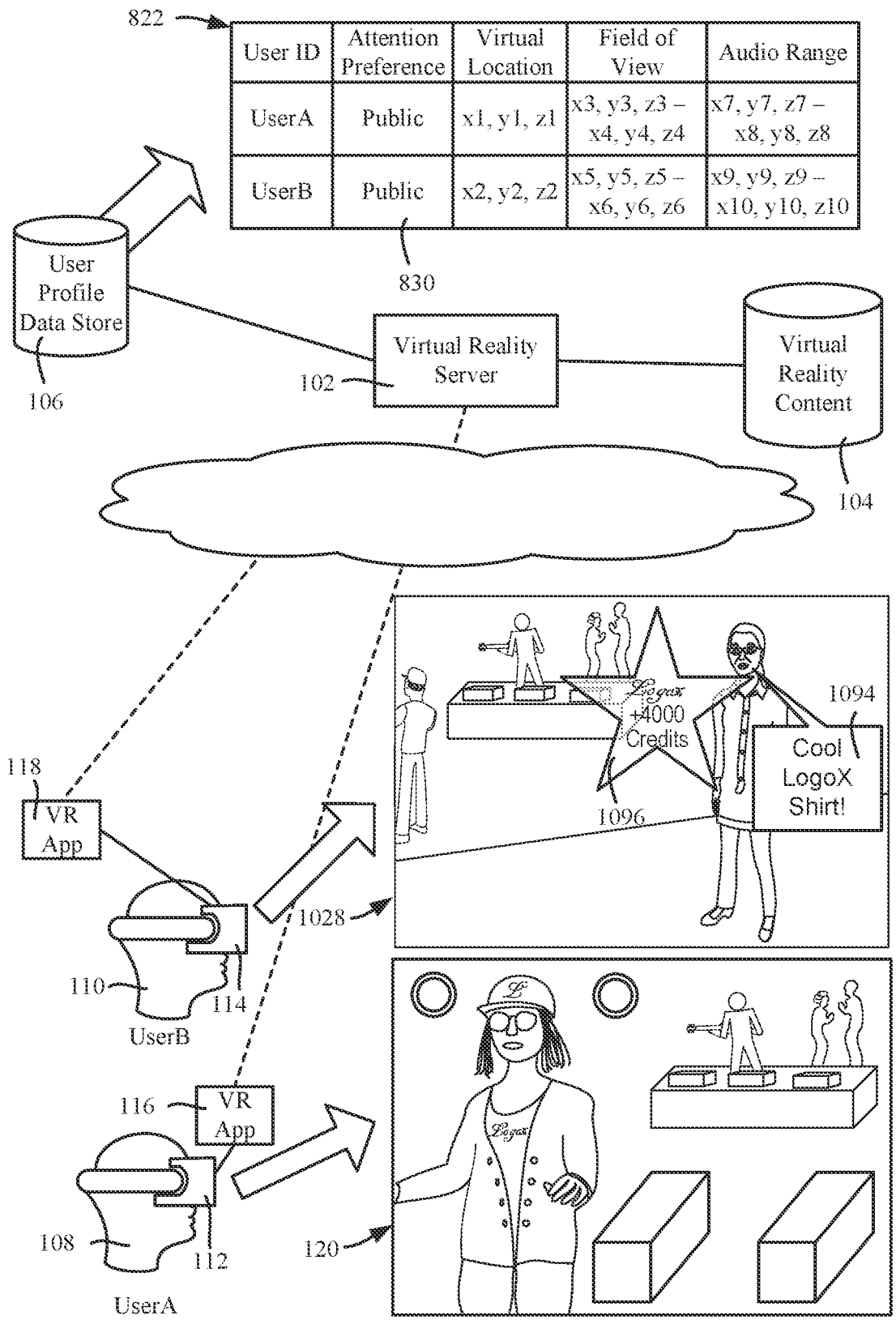
FIG. 10 is a block diagram of an example system/architecture, including an example interface showing a user being rewarded for attention to the user's avatar being recognizably noticed with respect to advertising, in accordance with various aspects and embodiments of the subject disclosure

In the example of FIGS. 8-10, consider that the UserB 108 may gain some value by having other users pay attention to her visually and/or audibly, and/or pay attention to where she goes and follow her there. The other user(s) can potentially observe other visual or audio content such as advertisements that are presented on her avatar (e.g., a virtual logo or tattoo), or presented near her avatar (e.g., on a virtual billboard behind her, where she may tend to intentionally be near). In this case, the UserB 108 desires to be in the field of view of other users or for those other users to be within her audio range, and thus sets her attention preference setting (field 830 in the updated data structure 822).

As before, these occurrences may be recorded and logged over time. Each such occurrence may be used to generate value for the UserB 108 such as advertisement revenue, and/or or social media status of value, such as an indication of the number of virtual reality social followers the UserB 108 has.

As shown in the example updated view 922 of the UserB 108 via the icon 990, the UserB 108 may optionally be presented (e.g., briefly) with a visual or audible indication of positive attention. This optionally also may be included by a presentation to the user of a value gained by that positive attention. In the example shown, for instance, the UserB's avatar is wearing a shirt with an advertisement 992 on it (as well as a logo hat), and the UserA 108 may observe the advertisement(s) as being within their field of view. The UserB's in this example presented with an indication of value that the UserB 108 gains by the UserA's positive attention to the UserB's advertisement-bearing avatar. The virtual reality server 102 may track a record of any credits earned, for sending to another server for processing and/or to retain and credit the user's account within the virtual reality system 100 (FIG. 1) itself.

The virtual reality server 102 also may monitor and analyze any interactions between users to detect any interaction such as a conversation that is an acknowledgment, which likely creates additional value for the advertisement given that the advertisement has definitely been seen (or heard). For example, if a conversation between the UserA 108 and the UserB 110 (or even a spoken comment that does not start a conversation) includes a mention of the advertiser, a larger credit may be granted to reflect the effectiveness of the advertisement. In the example view 1028 of the UserB 110 in FIG. 10, the detected comment represented in block 1094 generates additional credits for the UserB 110, as indicated via the icon 1096.

In the other direction back at an advertising avatar, is also feasible for a user to block an avatar or the avatars of a group of users at the same time. For example, consider a party where a user feels swarmed by avatars (possibly of bots) with advertisements; a user can block (filter out) such avatars as a group based on recognition of such advertisements, possibly excepting avatars of known users who may coincidentally have their avatars bearing such an advertisement (e.g., a logo of a popular clothing company).

Figure 11:
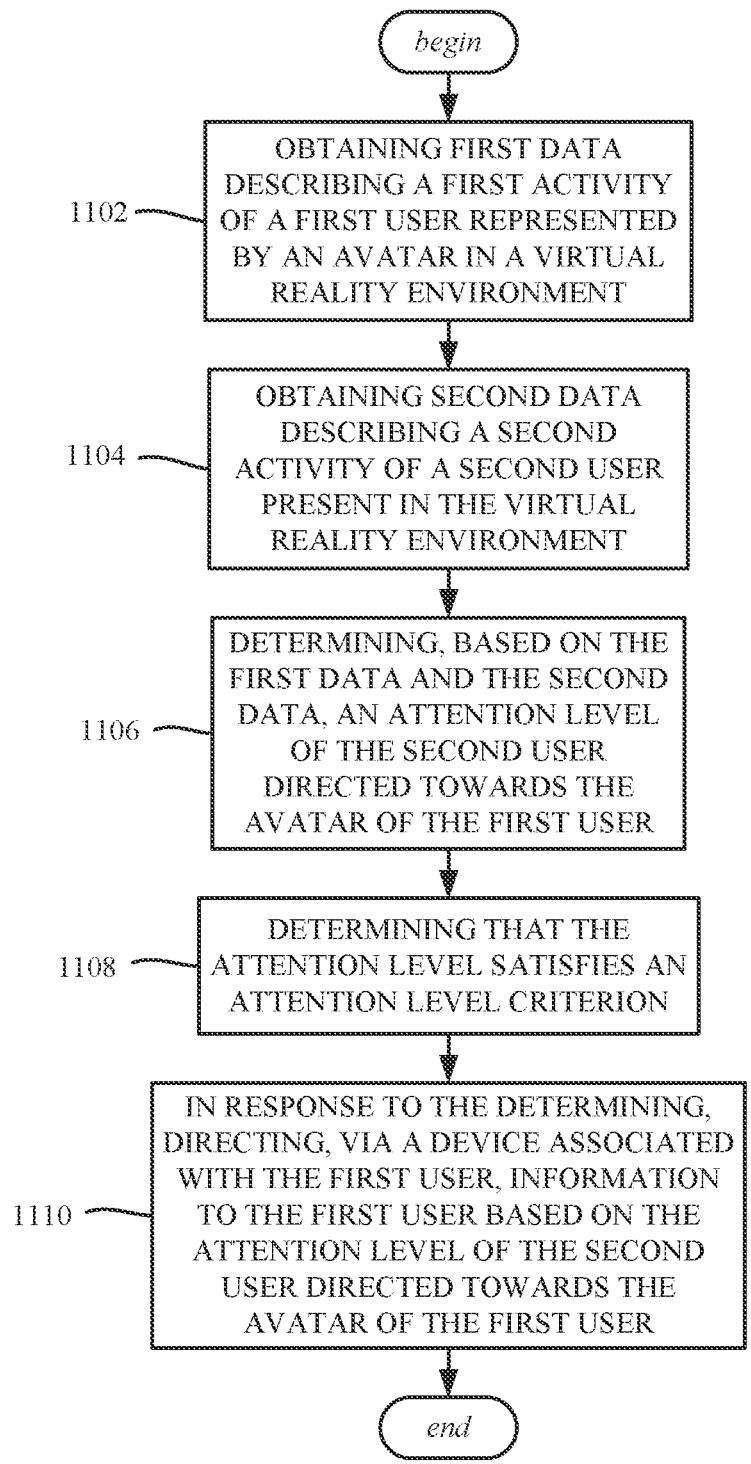
FIG. 11 is a flow diagram representing example operations related to directing information to a first user based on the attention level of a second user directed towards a virtual reality avatar of the first user, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents obtaining first data describing a first activity of a first user represented by an avatar in a virtual reality environment. Example operation 1104 represents obtaining second data describing a second activity of a second user present in the virtual reality environment. Example operation 1106 represents determining, based on the first data and the second data, an attention level of the second user directed towards the avatar of the first user. Example operation 1108 represents determining that the attention level satisfies an attention level criterion. Example operation 1110 represents in response to the determining, directing, via a device associated with the first user, information to the first user based on the attention level of the second user directed towards the avatar of the first user.

The data describing the second activity can include data describing a field of view of the second user within the virtual reality environment.

The data describing the second activity in the environment can include virtual location data.

The data describing the second activity can include data describing, for an amount of time, a field of view of the second user within the virtual reality environment relative to a location of the avatar.

The data describing the second activity can include data indicating that the second user is within an audio range, within which the second user is able to hear a voice of the first user. Further operations can include outputting, to the first user, a visible representation of the audio range. The information can indicate that the attention level is classified as negative attention, and further operations can include recommending, via the device of the first user, an interaction by the first user to enable the first user to narrow the audio range of the avatar of the first user.

The information can indicate that the attention level is classified as negative attention, and further operations can include sending, via the device of the first user, a remediation option to the first user to remediate the negative attention.

The information can indicate that the attention level is classified as negative attention, and further operations can include recommending, via the device of the first user, an interaction by the first user to block a first presentation of the avatar of the first user from being included in a second presentation rendered to the second user, or alter the first presentation of the avatar of the first user as part of rendering the second presentation to the second user.

The information can indicate that the attention level is classified as negative attention, and further operations can include operations can include recommending, via the device of the first user, an interaction by the first user to block future presentation of the avatar of the first user from being included in a current presentation rendered to the second user, or alter the future presentation of the avatar of the first user, resulting in an altered future presentation, as part of rendering the altered future presentation to the second user.

The information can indicate that the attention level is classified as positive attention, and further operations can include presenting advertisement content, in association with the avatar of the first user, in a presentation rendered to the second user.

The avatar of the first user can be a first avatar, and the level criterion can be based on at least one of: a distance of a second avatar of the second user to the first avatar, a field of view of the second user, a viewing time of viewing the first avatar by the second user, a first number of other avatars within the field of view of the second user other than the first avatar of the first user, or a second number of the other avatars within a defined proximate distance of the first avatar.

Figure 12:
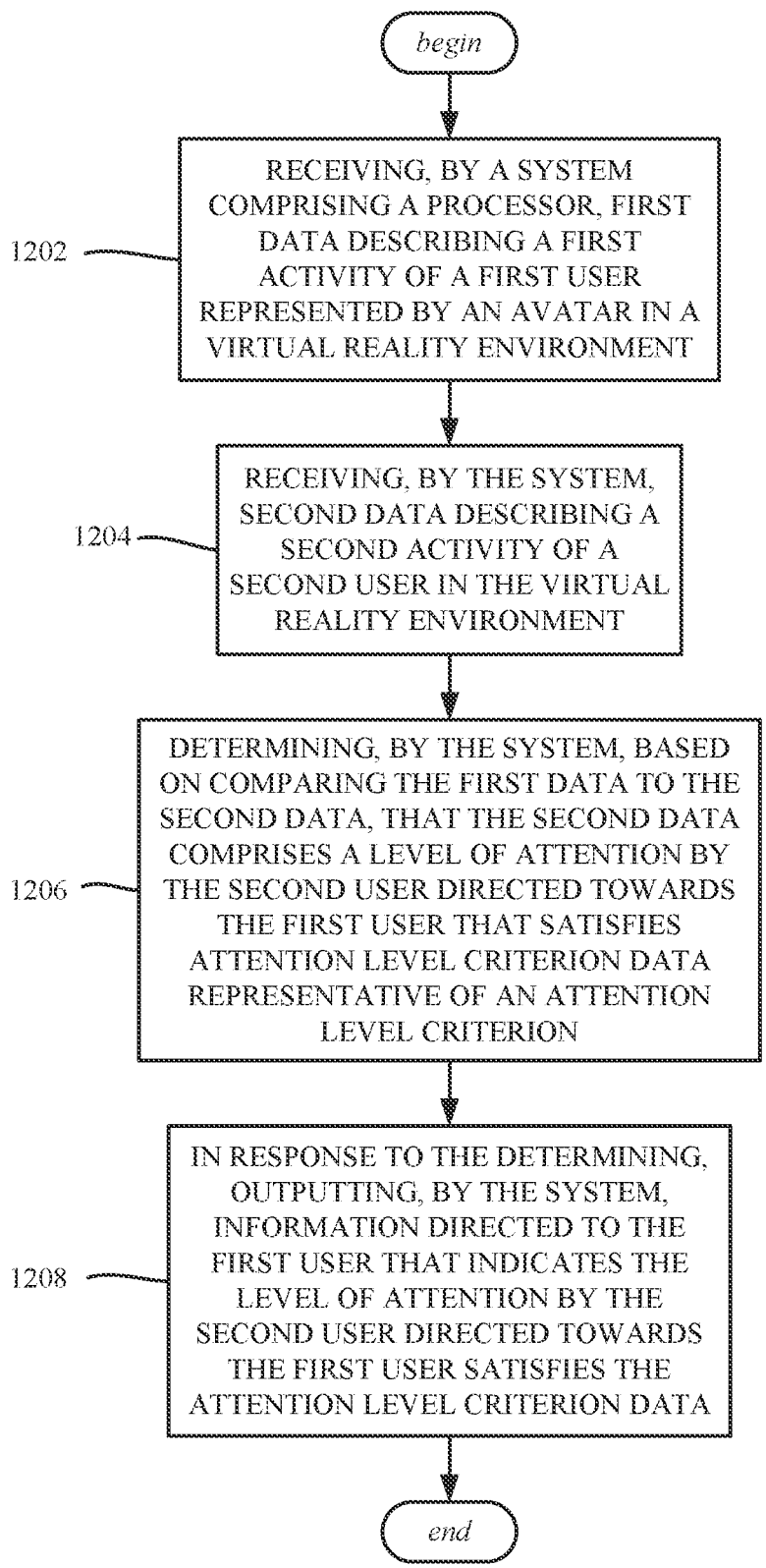
FIG. 12 is a flow diagram representing example operations related to outputting information to a first user based on the virtual reality activity of a second user satisfying attention level criterion data, in accordance with various aspects and embodiments of the subject disclosure.

One or more example aspects are represented in FIG. 12, and, for example, can correspond to operations, such as of a method. Example operation 1202 represents receiving, by a system comprising a processor, first data describing a first activity of a first user represented by an avatar in a virtual reality environment. Example operation 1204 represents receiving, by the system, second data describing a second activity of a second user in the virtual reality environment. Example operation 1206 represents determining, by the system, based on comparing the first data to the second data, that the second data comprises a level of attention by the second user directed towards the first user that satisfies attention level criterion data representative of an attention level criterion. Example operation 1208 represents, in response to the determining, outputting, by the system, information directed to the first user that indicates the level of attention by the second user directed towards the first user satisfies the attention level criterion data.

Receiving the first data can include receiving virtual location data describing a virtual location of the first user within the virtual reality environment.

Receiving the second data can include receiving data describing a field of view of the second user with respect to the virtual reality environment.

Further operations can include, in response to the determining, presenting, by the system, at least one remediation option to the first user.

Figure 13:
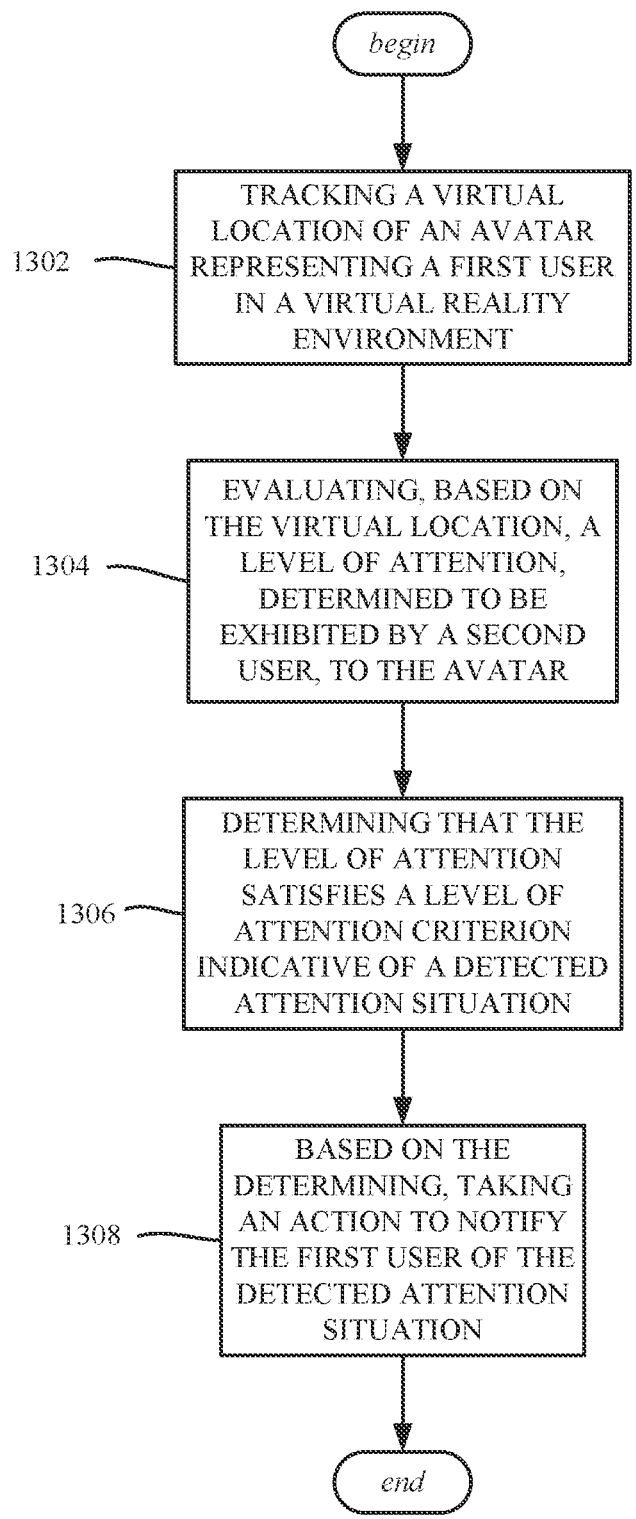
FIG. 13 is a flow diagram representing example operations related to taking action to notify a first user based on the virtual reality attention level exhibited by second user satisfying a criterion, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents tracking a virtual location of an avatar representing a first user in a virtual reality environment. Example operation 1304 represents evaluating, based on the virtual location, a level of attention, determined to be exhibited by a second user, to the avatar. Example operation 1306 represents determining that the level of attention satisfies a level of attention criterion indicative of a detected attention situation. Example operation 1308 represents, based on the determining, taking an action to notify the first user of the detected attention situation.

Further operations can include receiving user input associated with the first user that selects a remediation action to remediate an aspect of the level of attention determined to be exhibited by the second user.

The virtual location can be a first virtual location, the avatar can be a first avatar, and evaluating of the level of attention, determined to be exhibited by the second user to the first avatar can include tracking at least one of: a field of view of the second user, the field of view of the second user for an associated amount of time, a second virtual location of a second avatar of the second user relative to the first virtual location of the first avatar, or the second virtual location of the second avatar of the second user relative to the first virtual location of the first avatar for an associated amount of time.

Further operations can include altering a presentation, of the avatar representing the first user, to the second user.

As can be seen, the technology described herein facilitates a user detecting any other user(s), within a virtual reality environment occupied by the other user(s), who based on their activity may be paying significant attention to an avatar of the user. The attention that is exhibited, whether for negative or positive purposes, can be used to alert the user of the attention-based activity by another user (e.g., satisfying attention threshold criterion data). In this way, the system, in conjunction with the user, can take action, such as to block the other user's activity, or to potentially reward the user because of the other user's activity.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 14:
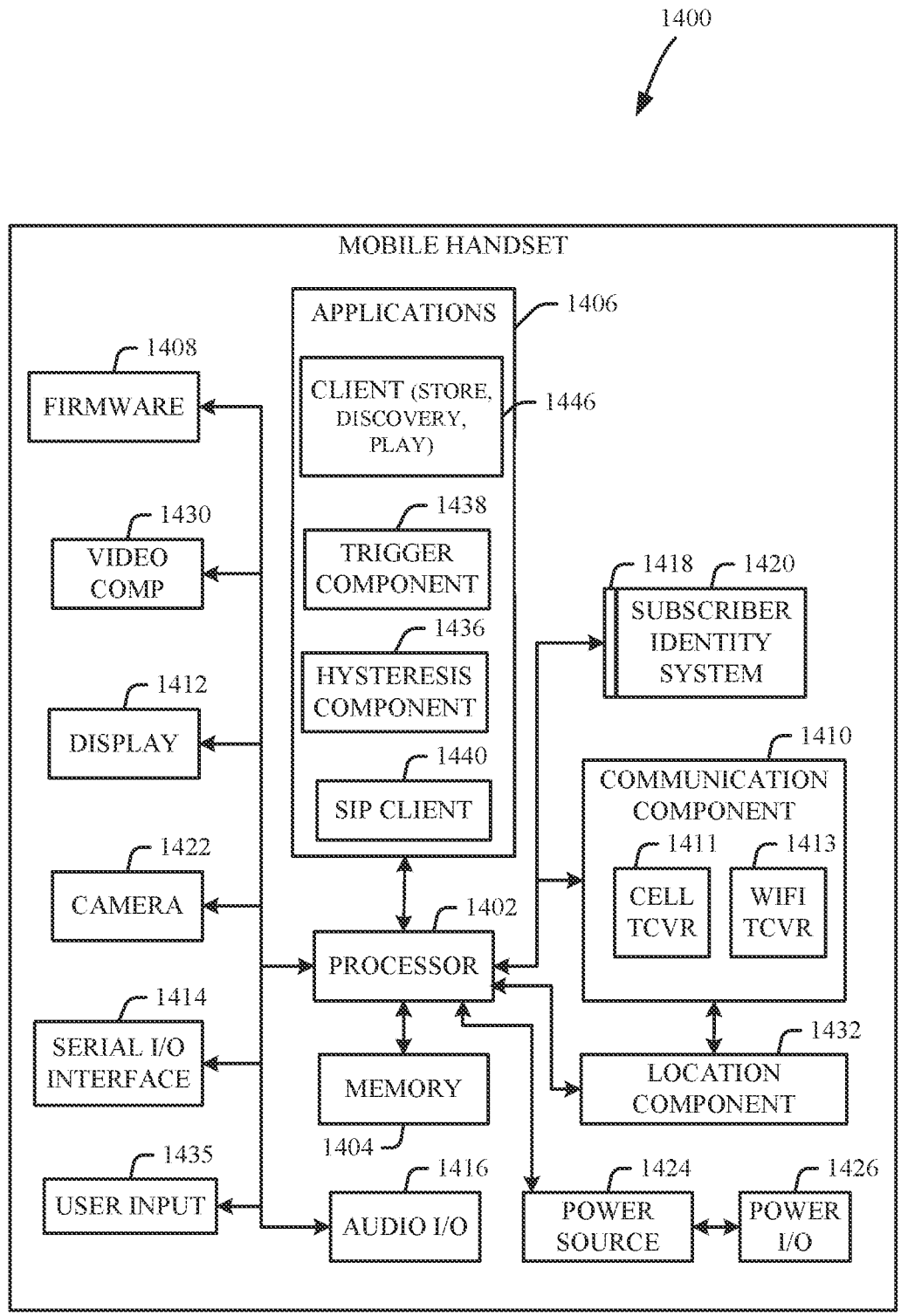
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hard-wire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
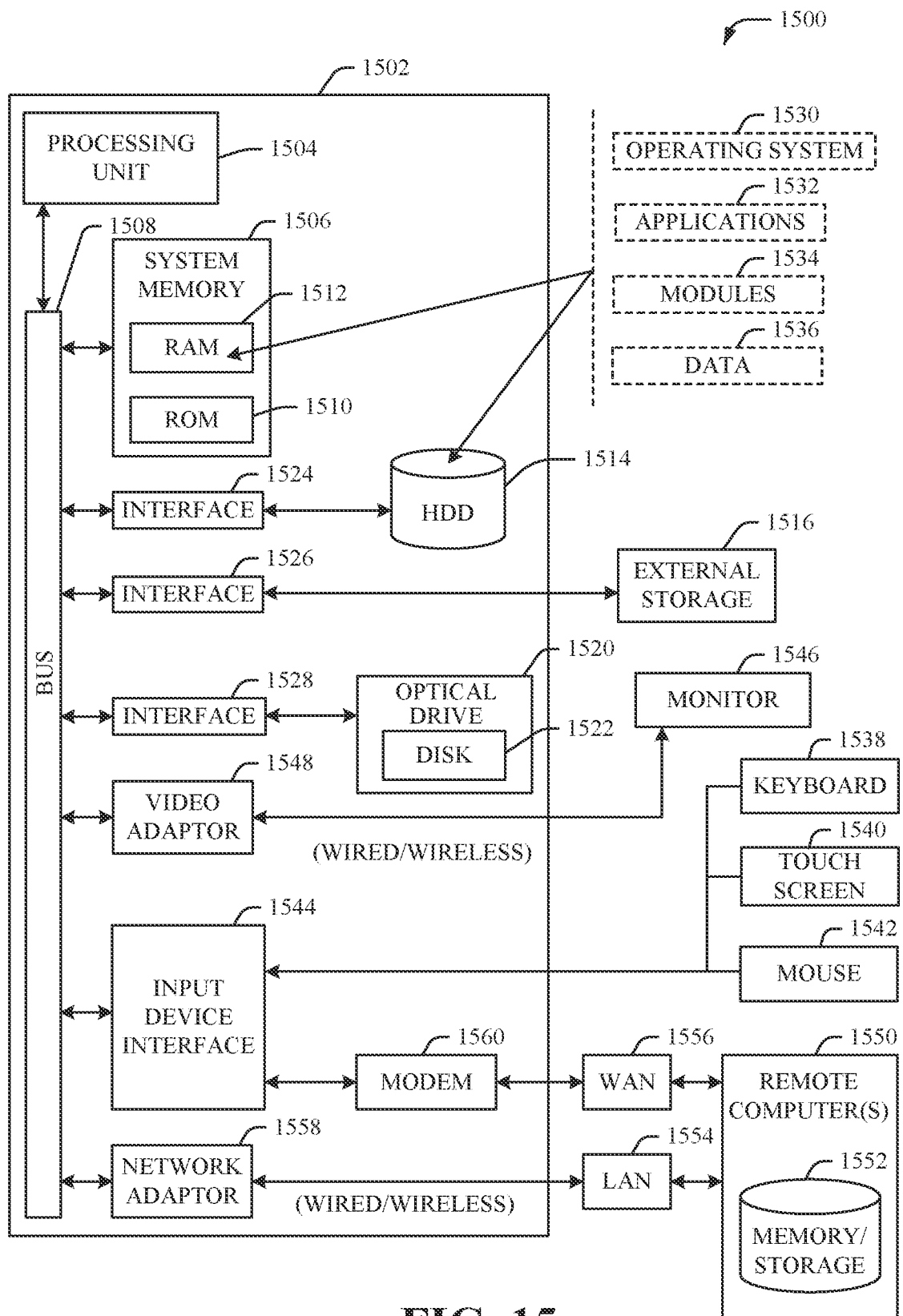
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown).

Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        obtaining first data describing a first activity of a first user represented by a first avatar in a virtual reality environment;
        obtaining second data describing a second activity of a second user represented by a second avatar in the virtual reality environment;
        determining, based on the first data and the second data, an attention level of the second user directed towards the first avatar of the first user over a same period of time by tracking virtual location data and a field of view of the second user over time, wherein a respective field of view of the first user and the second user is timestamped and logged over time;
        determining that the attention level satisfies an attention level criterion by comparing the field of view of the second user over time with virtual location data of the first user over the same period of time and detecting common timestamps and by comparing a virtual location of the second user with an audio range of the first user determined based on a virtual location of the first user when the field of view of the second user is not directed to the first avatar of the first user or in a field of view of the first user; and in response to the determining that the attention level satisfies the attention level criterion, directing, via a device associated with the first user, information to the first user based on the attention level of the second user directed towards the first avatar of the first user.

2. The system of claim 1, wherein the second data describing the second activity comprises data describing the field of view of the second user within the virtual reality environment and the determining that the attention level satisfies the attention level criterion further comprises analyzing a field of view log of the second user.

3. The system of claim 1, wherein the second data describing the second activity in the virtual reality environment comprises the virtual location data of the second user, and the attention level is indicative of a pattern of unwanted attention towards the first avatar of the first user.

4. The system of claim 1, wherein the second data describing the second activity comprises data describing, for the same period of time, a frequency and a pattern of, the field of view of the second user within the virtual reality environment relative to a location of the first avatar.

5. The system of claim 1, wherein the second data describing the second activity further comprises data indicating that the second user is within the audio range, within which the second user is able to hear a voice of the first user.

6. The system of claim 5, wherein the operations further comprise outputting, to the first user, a visible representation of the audio range.

7. The system of claim 5, wherein the information indicates the attention level is classified as negative attention, and wherein the operations further comprise recommending, via the device associated with the first user, an interaction by the first user to enable the first user to narrow the audio range of the first avatar of the first user.

8. The system of claim 1, wherein the information indicates the attention level is classified as negative attention, and wherein the operations further comprise sending, via the device associated with the first user, a remediation option to the first user to remediate the negative attention.

9. The system of claim 1, wherein the information indicates the attention level is classified as negative attention, and the operations further comprise recommending, via the device associated with the first user, an interaction by the first user to block a first presentation of the first avatar of the first user from being included in a second presentation rendered to the second user, or alter the first presentation of the first avatar of the first user as part of rendering the second presentation to the second user.

10. The system of claim 1, wherein the information indicates the attention level is classified as negative attention, and the operations further comprise recommending, via the device associated with the first user, an interaction by the first user to block a future presentation of the first avatar of the first user from being included in a current presentation rendered to the second user, or alter the future presentation of the first avatar of the first user, resulting in an altered future presentation, as part of rendering the altered future presentation to the second user.

11. The system of claim 1, wherein the information indicates the attention level is classified as positive attention, and the operations further comprise presenting advertisement content, in association with the first avatar of the first user, in a presentation rendered to the second user.

12. The system of claim 1, wherein the attention level criterion is based on at least one of: a virtual distance of the second avatar of the second user to the first avatar, the field of view of the second user, a viewing time of viewing the first avatar by the second user, a first number of other avatars within the field of view of the second user other than the first avatar of the first user, or a second number of the other avatars within a defined proximate distance of the first avatar.

13. A method, comprising:

receiving, by a system comprising a processor, first data describing a first activity of a first user represented by an avatar in a virtual reality environment;

receiving, by the system, second data describing a second activity of a second user in the virtual reality environment;

determining, by the system, based on comparing the first data to the second data, that the second data comprises a level of attention by the second user directed towards the avatar of the first user over a same period of time that satisfies attention level criterion data representative of an attention level criterion, wherein a respective field of view of the first user and the second user is timestamped and logged over time;

wherein the comparing further comprises comparing a field of view of the second user over time with a virtual location of the avatar of the first user over the same period of time and detecting common timestamps and by comparing a virtual location of the second user with an audio range of the first user determined based on the virtual location of the avatar of the first user when the field of view of the second user is not directed to the avatar of the first user or in a field of view of the first user; and in response to the determining, outputting, by the system, information directed to the first user that indicates the level of attention by the second user directed towards the first user satisfies the attention level criterion data.

14. The method of claim 13, wherein the receiving of the first data comprises receiving virtual location data describing the virtual location of the avatar of the first user within the virtual reality environment.

15. The method of claim 13, wherein the receiving of the second data comprises receiving data describing the field of view of the second user with respect to the virtual reality environment.

16. The method of claim 13, further comprising, in response to the determining, presenting, by the system, at least one remediation option to the first user.

17. A non-transitory machine-readable medium, comprising executable instructions that, when executed by a processor, facilitate performance of operations, the operations comprising:

tracking a virtual location of an avatar representing a first user in a virtual reality environment;

evaluating, based on the virtual location of the avatar, a level of attention, determined to be exhibited by a second user, to the avatar over a same period of time, wherein a respective field of view of the first user and the second user is timestamped and logged over time;

wherein the evaluating comprises comparing a field of view of the second user over time with the virtual location of the avatar over the same period of time and detecting common timestamps and comparing a virtual location of the second user with an audio range of the first user determined based on the virtual location of the avatar when the field of view of the second user is not directed to the avatar or in a field of view of the first user;

determining that the level of attention satisfies a level of attention criterion indicative of a detected attention situation; and based on the determining, taking an action to notify the first user of the detected attention situation.

18. The non-transitory machine-readable medium of claim 17, wherein the operations further comprise receiving user input associated with the first user that selects a remediation action to remediate an aspect of the level of attention determined to be exhibited by the second user.

19. The non-transitory machine-readable medium of claim 17, wherein the virtual location is a first virtual location, wherein the avatar is a first avatar, and wherein the evaluating of the level of attention, determined to be exhibited by the second user, to the first avatar comprises tracking at least one of: the field of view of the second user, the field of view of the second user for an associated amount of time, a second virtual location of a second avatar of the second user relative to the first virtual location of the first avatar, or the second virtual location of the second avatar of the second user relative to the first virtual location of the first avatar for an associated amount of time.

20. The non-transitory machine-readable medium of claim 17, wherein the operations further comprise altering a presentation, of the avatar representing the first user, to the second user.

\* \* \* \* \*